(12) United States Patent
Li

(10) Patent No.: US 8,657,311 B2
(45) Date of Patent: Feb. 25, 2014

(54) STROLLER FRAME WITH A SWIVEL SEAT AND A LIMITING MECHANISM

(75) Inventor: Wei-Yeh Li, Tainan County (TW)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 466 days.

(21) Appl. No.: 13/024,920

(22) Filed: Feb. 10, 2011

(65) Prior Publication Data

US 2011/0193325 A1 Aug. 11, 2011

(30) Foreign Application Priority Data

Feb. 11, 2010 (CN) .......................... 2010 1 0115594

(51) Int. Cl.
*B62B 7/14* (2006.01)

(52) U.S. Cl.
USPC .......................... 280/47.39; 280/650; 280/658

(58) Field of Classification Search
USPC ................. 280/642–644, 647–650, 657, 658, 280/47.38–47.4, 79.2
See application file for complete search history.

(56) References Cited

U.S. PATENT DOCUMENTS

| | | | | |
|---|---|---|---|---|
| 5,513,864 A * | 5/1996 | Huang | .................... | 280/47.36 |
| 5,549,311 A * | 8/1996 | Huang | .................... | 280/47.36 |
| 6,513,827 B1 * | 2/2003 | Barenbrug | ............... | 280/648 |
| 7,032,922 B1 * | 4/2006 | Lan | ............................ | 280/648 |
| 7,273,225 B2 * | 9/2007 | Yeh | ............................ | 280/648 |
| 7,367,581 B2 * | 5/2008 | Yang | ........................... | 280/642 |
| 7,377,537 B2 * | 5/2008 | Li | ................................ | 280/650 |
| 7,401,803 B1 * | 7/2008 | Lai | ............................. | 280/647 |
| 7,753,398 B2 * | 7/2010 | Yang | ........................... | 280/642 |
| 7,766,366 B2 * | 8/2010 | Li | ................................ | 280/642 |
| 7,789,402 B2 * | 9/2010 | Saville et al. | ........... | 280/47.38 |
| 7,891,696 B2 * | 2/2011 | Hanson | ....................... | 280/647 |
| 8,029,014 B2 * | 10/2011 | Ahnert et al. | ............... | 280/650 |
| 8,087,689 B2 * | 1/2012 | Fritz et al. | ................... | 280/647 |
| 8,128,119 B2 * | 3/2012 | Saville et al. | ............... | 280/648 |
| 8,205,906 B2 * | 6/2012 | Kretschmer et al. | ........ | 280/642 |
| 8,251,382 B2 * | 8/2012 | Chen et al. | ............... | 280/47.41 |
| 8,398,111 B2 * | 3/2013 | Mival et al. | .................. | 280/648 |
| 8,434,781 B2 * | 5/2013 | Mazar et al. | ................. | 280/648 |
| 8,448,977 B2 * | 5/2013 | Grintz et al. | ................. | 280/642 |
| 2003/0025300 A1 * | 2/2003 | Maxisch | ..................... | 280/642 |
| 2008/0042476 A1 * | 2/2008 | Hei et al. | ..................... | 297/118 |
| 2009/0160162 A1 * | 6/2009 | Bizzell et al. | ................ | 280/642 |
| 2012/0169030 A1 * | 7/2012 | Bizzell et al. | ................ | 280/642 |

* cited by examiner

*Primary Examiner* — Katy M Ebner
(74) *Attorney, Agent, or Firm* — Morris Manning & Martin LLP; Tim Tingkang Xia, Esq.

(57) ABSTRACT

A stroller frame includes a wheeled frame, a seat support, a handle bar and a limiting mechanism. The wheeled frame has a front wheel side and rear wheel side. The seat support is pivotally mounted atop the wheeled frame about a seat support axis, and selectively may have a forward facing direction and a rearward facing direction positioned by a locking member. The handle bar is pivotally and lockably connected to the seat support about a handle bar axis and associated with the locking member for interchanging the facing directions of the seat support. The limiting mechanism is associated between the wheeled frame, the seat support and the handle bar, for preventing the handle bar from rotating about the handle bar axis from the upright position to a position extending toward the front wheel side while tilting up the handle bar and rotating the seat support for interchanging the facing directions.

12 Claims, 10 Drawing Sheets

STROLLER FRAME WITH A SWIVEL SEAT AND A LIMITING MECHANISM

CROSS-REFERENCE TO RELATED APPLICATIONS

This non-provisional application claims benefits and priority under 35 U.S.C. §119(a) on Chinese Patent Application No. CN/201010115594.2 filed in The People's Republic of China on Feb. 11, 2010, which is incorporated herein by reference in its entirety.

BACKGROUND OF THE INVENTION

1. Field of the Invention

The present invention relates generally to a stroller with a swivel seat, especially to a stroller which can prevent its handle bar from laying down onto the front wheel side when the swivel seat is rotated to a new facing direction.

2. Description of the Related Art

Baby stroller is provided for traveling a baby pushed by care-giver behind. Normally, the seat and handle bar of a baby stroller are fixed, thus the little occupant must face forward. But sometimes, the baby-occupant is crying and needs to see and talk to the care-giver immediately.

A baby stroller featuring a rotatable handle bar is disclosed in U.S. Pat. No. 5,845,924. The handle bar pivots to the baby stroller frame and allows changing and fixing the direction thereof in either forward or backward direction. By changing the direction of the handle bar, the baby-occupant therefore may face rearward to see and communicate with the care-giver while traveling without stop the stroller on the road.

However, the care-giver felt it is difficult to change the direction of the stroller by rotation of the handle bar if doing such inside a narrow, tiny and crowded elevator. Further, normally the rear wheel sets can only rotate in a fixed direction, and only the front wheel sets can swivel as a castors and capable of swiveling freely for easy steering. It would be difficult to take a turn while the handle bar is stayed on the front wheel side.

A newly improvement of the baby stroller disclosed in U.S. Pat. No. 7,367,581 has equipped with a swivel seat lockable in a forward direction and a reward direction, and can be unlocked by rotating the handle bar to an upright position thereof, so as to turn and change the seat's facing direction. However, some of the users or care-givers may unintentionally lay down the handle bar onto the front wheel side after changed the seat's facing direction, and then mad about the difficulty of steering the stroller.

SUMMARY OF THE INVENTION

To avoid such a dilemma circumstance and anger for the care-giver, the present invention provides a stroller frame with a swivel seat and a limiting mechanism, which includes at least a wheeled frame, a seat support, a handle bar and a limiting mechanism. The wheeled frame has a front wheel side and rear wheel side. The seat support is pivotally mounted atop the wheeled frame about a seat support axis, and may selectively locked in a forward facing direction and a rearward facing direction by a locking member. The handle bar is pivotally and lockably connected to the seat support about a handle bar axis and associated with the locking member for interchanging the facing directions of the seat support. The limiting mechanism is associated between the wheeled frame, the seat support and the handle bar, for preventing the handle bar from rotating about the handle bar axis from the upright position to a position extending toward the front wheel side while tilting up the handle bar and rotating the seat support for interchanging the facing directions.

By this way, the limiting mechanism provides the function for avoiding the users or care-givers from unintentionally laying down the handle bar onto the front wheel side while changing the facing direction of the swivel seat.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
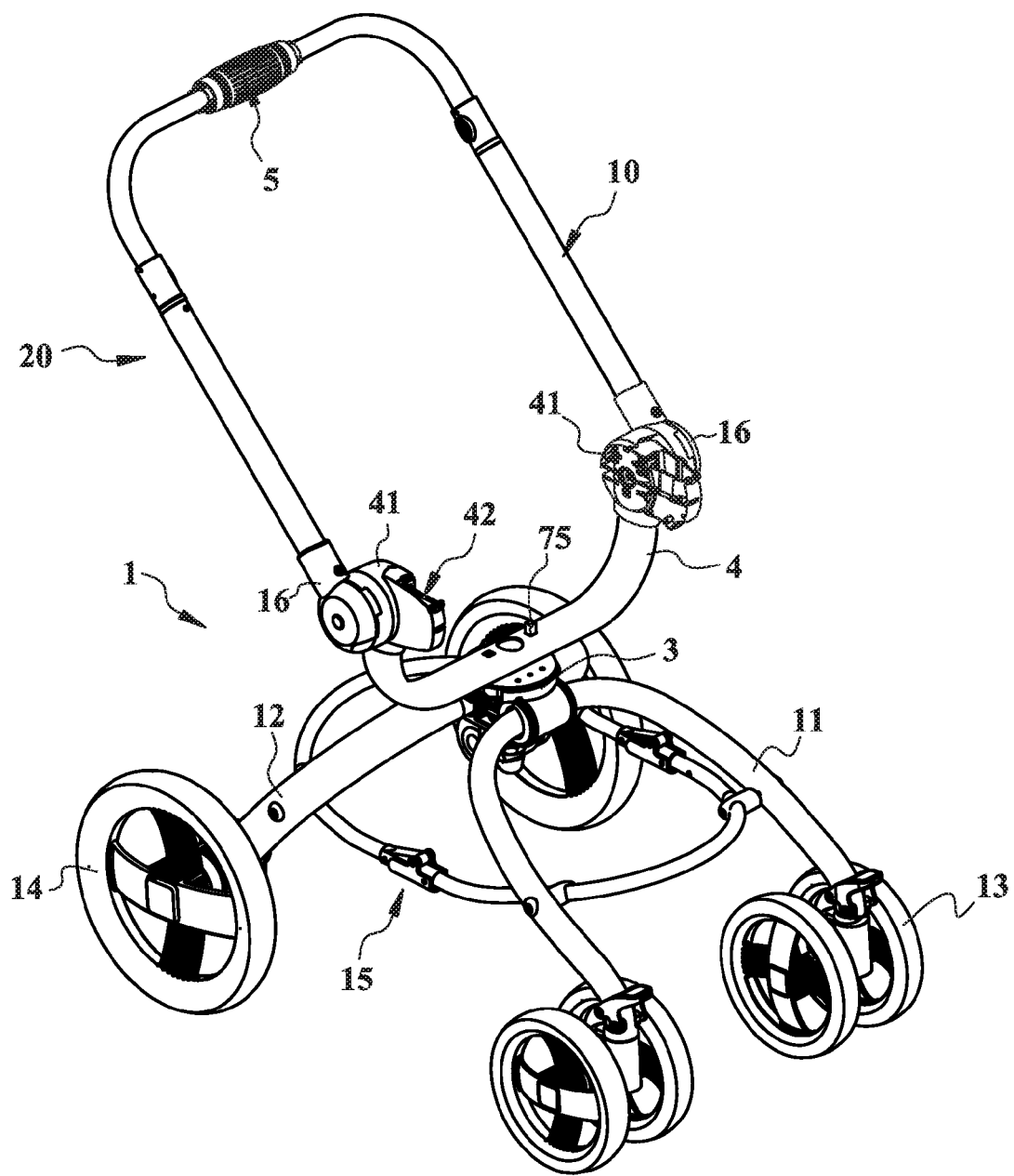
FIG. 1 is a perspective view showing an embodiment of the baby stroller frame which being eliminated the swivel seat for better understanding to the present invention.

Reference will now be made in detail to the preferred embodiments of the present invention; examples of which are illustrated in the accompanying drawings.

Referring to FIGS. 1 to 10, the embodiment of stroller frame with the swivel seat and a limiting mechanism according to the present invention, comprises at least a wheeled frame 1, a seat support 4, a handle bar 10 and a limiting mechanism 7.

The wheeled frame 1 has a front wheel side and rear wheel side, and includes a pivotal support base 3, a front leg 11, a rear leg 12, front wheel set 13 and rear wheel set 14. The front leg 11 and the rear leg 12 each has an upper end pivoted to the pivotal support base 3. Preferably, a linking rod 15 is pivoted between the front leg 11 and the rear leg 12 for keeping the wheeled frame 1 in an in-use position.

The lower end of the front leg 11 is provided with a front wheel set 13. The front wheel set 13 has an unfixed-direction mode and functioning as a castor. The lower end of the rear leg 12 is provided with a rear wheel set 14. The rear wheel set 14 has a fixed-direction mode.

Figure 2:
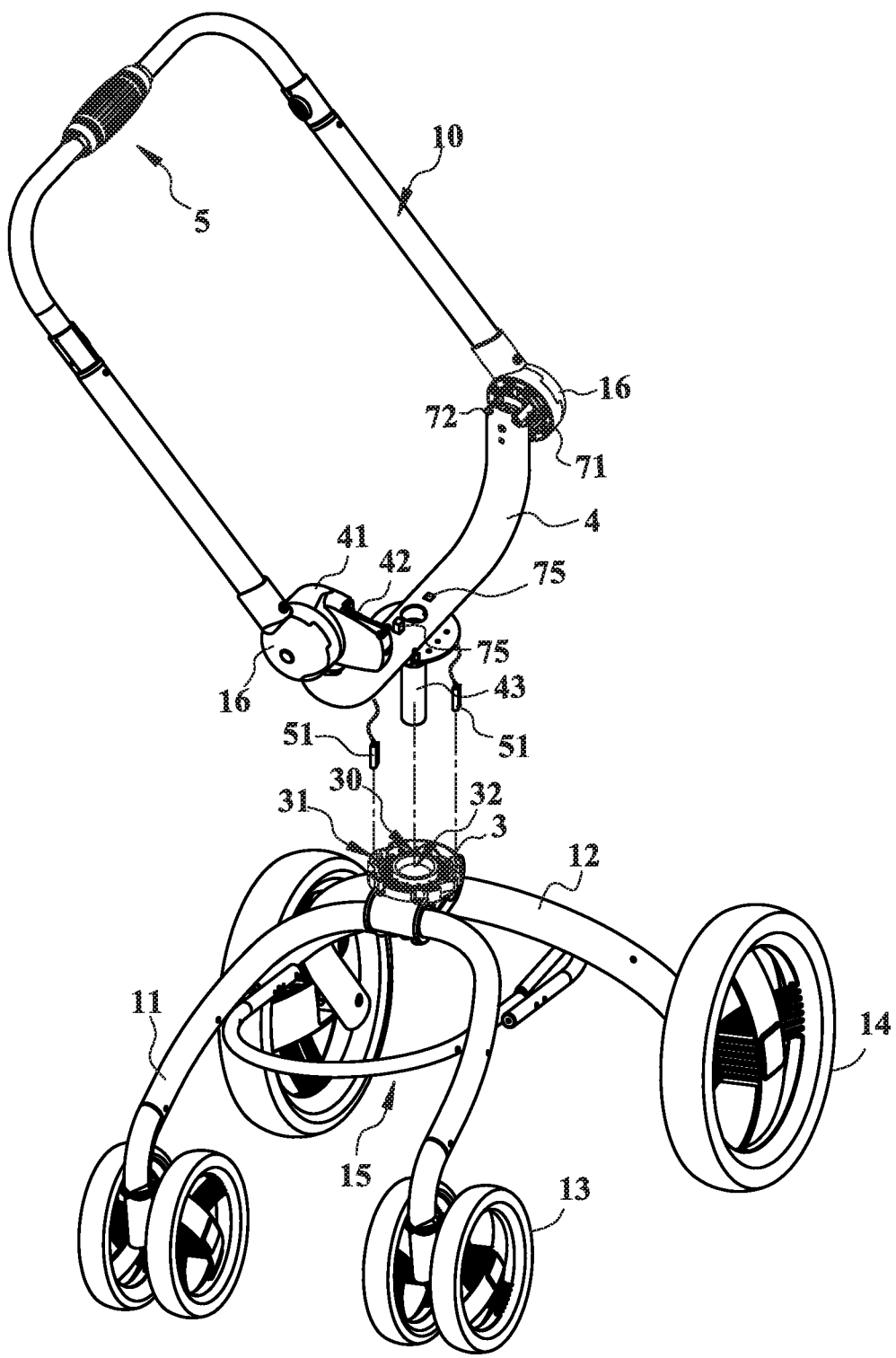
FIG. 2 is a exploded perspective view showing an embodiment of the baby stroller frame which also being eliminated the swivel seat for better understanding to the present invention.
Figure 4:
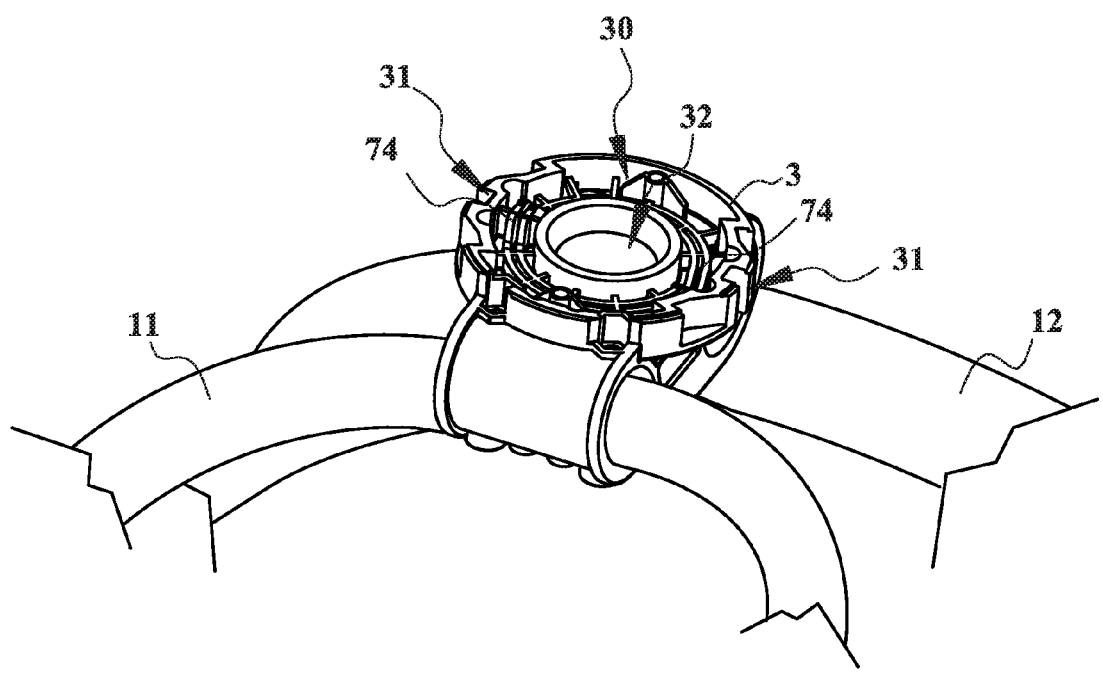
FIG. 4 is an enlarged perspective view showing the feature of the support mount which having a driving slant for driving the limiting mechanism while swiveling the seat support thereupon.
Figure 5:
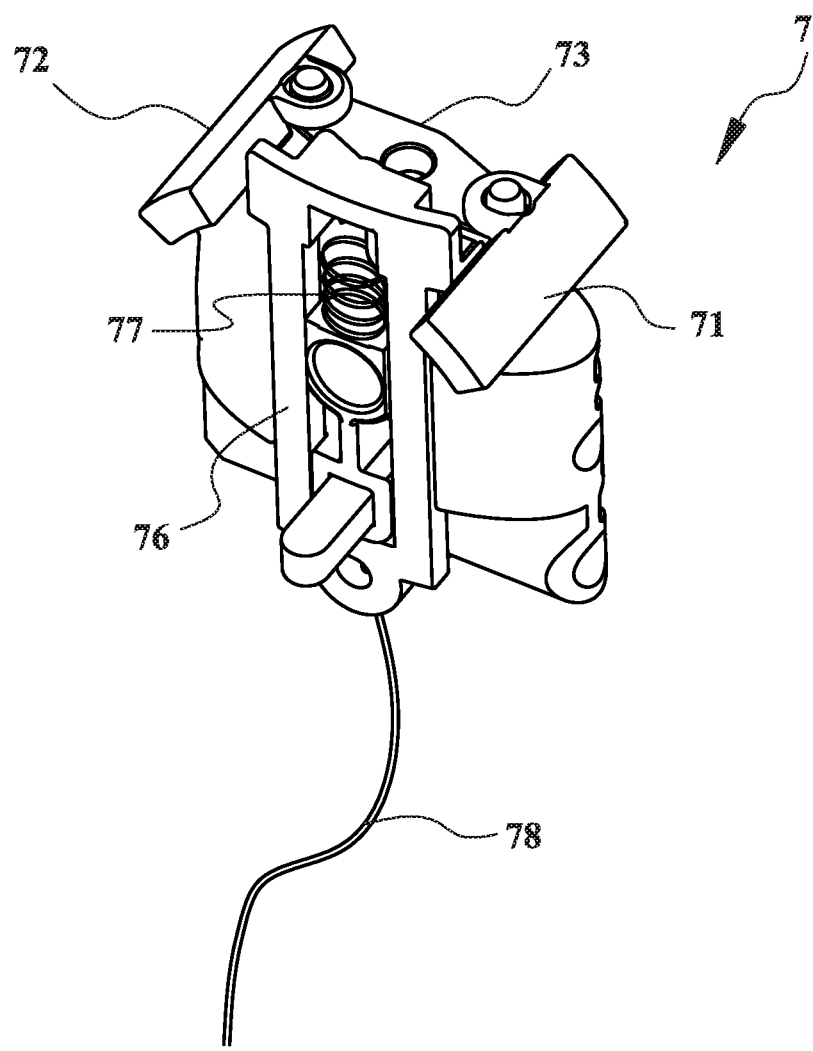
FIG. 5 is an enlarged perspective view showing the features of the limiting mechanism which being eliminated the driving elements.
Figure 6:
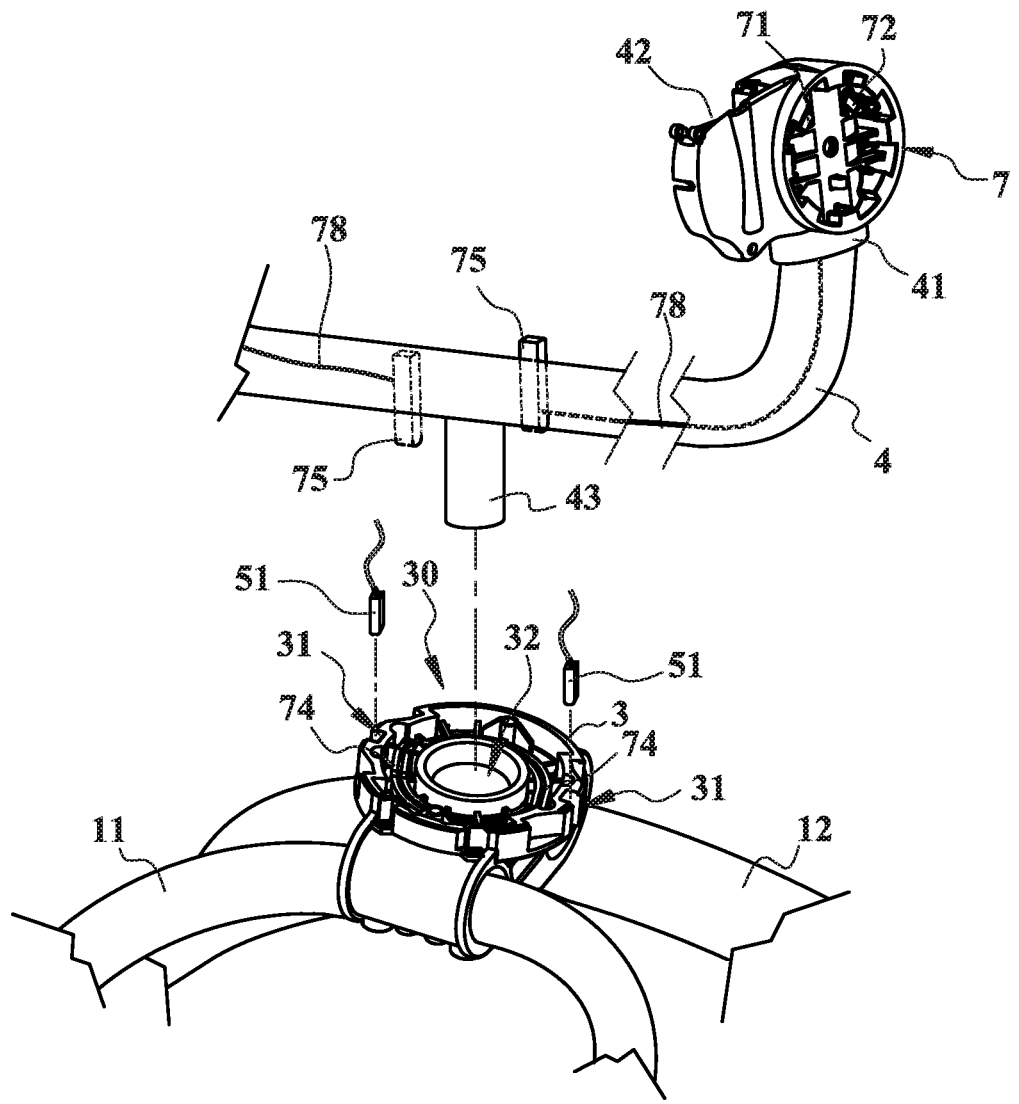
FIG. 6 is an enlarged perspective view schematically showing the relation between the support mount, seat support; wherein also showing the relative position between the driving slant formed atop the support mount and the driving slant of the limiting mechanism.
Figure 7:
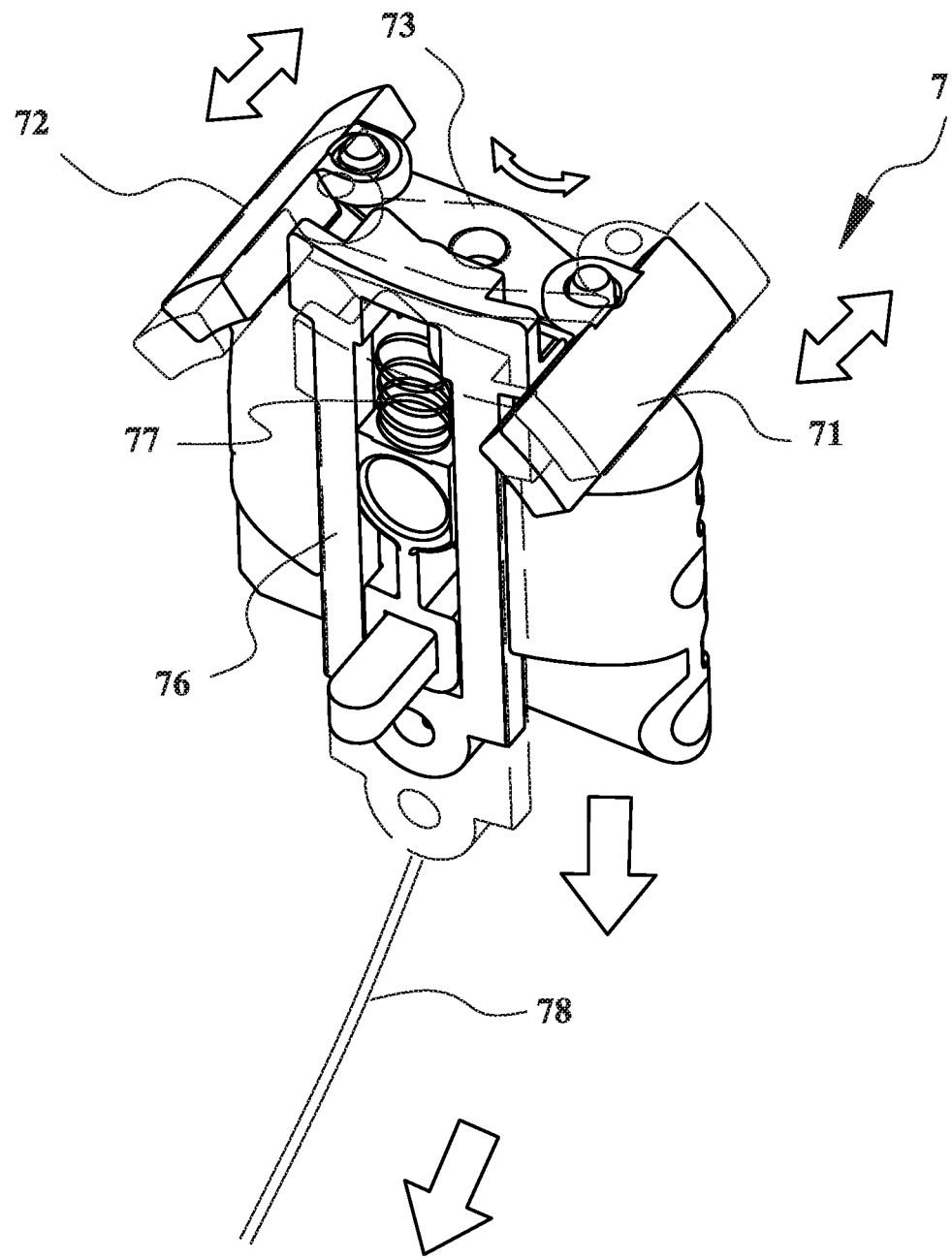
FIG. 7 is an enlarged perspective view schematically showing the operation of the limiting mechanism; wherein the pair of stoppers protrude and retract in turn while the swivel seat is swiveled and the movement-transfer slider is driven by the driving slant.

Referring to the FIGS. 2, 4 and 6, the pivotal support base 3 is formed with an axle hole 32 and a pair of locking positions 31. The pair of locking positions 31 may be embodied as two recesses or indents which spaced 180° apart from each other.

Figure 3:
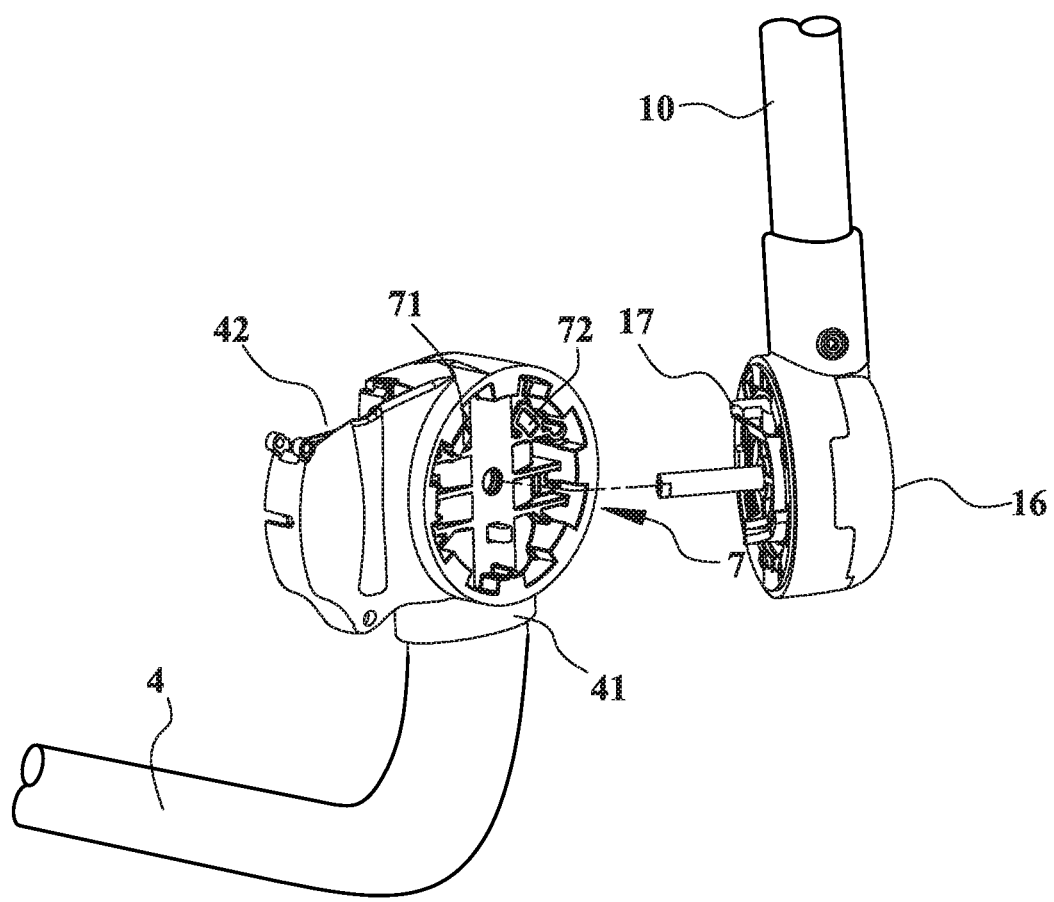
FIG. 3 is a perspective view schematically showing the relative position between the connecting portion of the seat support, the rotate joint of the handle bar and the pair of stoppers of the limiting mechanism according to the present invention.
Figure 10:
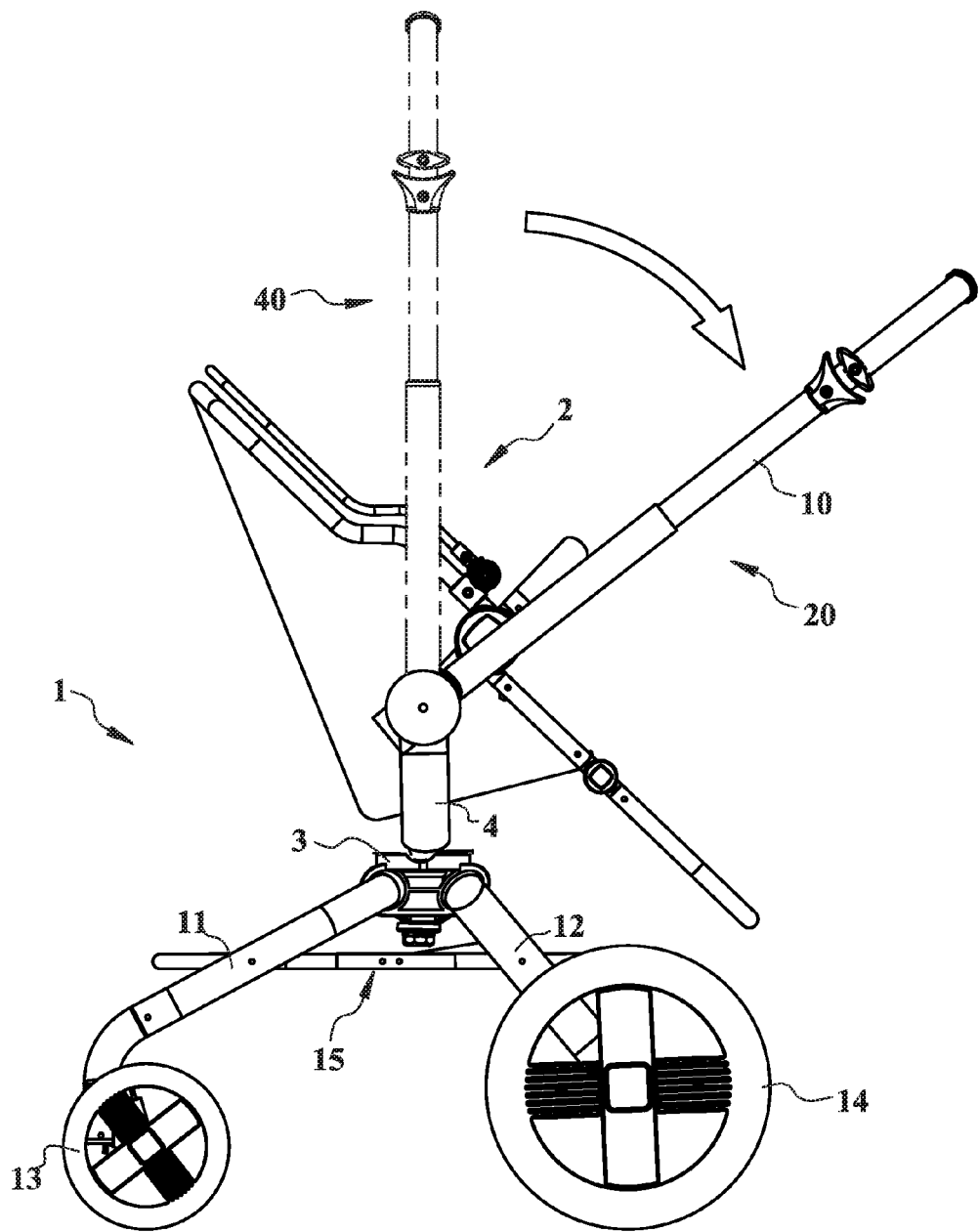
FIG. 10 is a perspective view schematically showing a swivel seat connected to the seat support in rear facing direction, and the handle bar restored to the rearward pushing position (i.e. locked on the rear wheel side) for pushing the stroller.

Referring to FIGS. 2, 3 and 6, a swivel seat 2 shown in FIG. 10 is supported by the seat support 4, and has at least a forward facing direction and a rearward facing direction. A locking member 51 is associated with the handle bar 10 and operatively installed on the stroller for locking the swivel seat 2 in either the forward facing direction or rearward facing direction;

For example, the seat support 4 is pivotally mounted atop the wheeled frame 1 about a seat support axis, and has a forward facing direction and a rearward facing direction. Preferably, the seat support 4 has a downward extending shaft 43 extended downwardly and pivotally retained within the axle hole 32 and a pair of arms extended upwardly. Each end of the arms of the seat support 4 is provided with a connecting base 41 and a socket 42. The connecting base 41 pivots the lower end of the handle bar 10. The socket 42 may detachably connect a seat 2, a carry cot or a vehicle safety seat (not shown). The locking member 51 is operatively and retractably installed in the underside of the seat support 4 for releasably engaging with the locking positions 31, so as to lock the seat support 4 as well as the seat 2, the carry cot or the vehicle safety seat in a forward facing direction and a rearward facing direction.

The handle bar 10 is pivotally and lockably connected to the seat support 4 about a handle bar axis and associated with the locking member 51 for interchanging the facing directions of the seat support 4. Referring to FIG. 3, the handle bar 10 has a rotate joint 16 pivoted to the connecting base 41; meanwhile, the rotate joint 16 has an extending portion 17 protruded into the connecting base 41. The limiting mechanism 7 includes a pair of stoppers 71, 72 which can retract and protrude in turn within the connecting base 41 for stopping the handle bar 10 when being rotated to the upright position 40 until the seat support 4 and the swivel seat 2 being swiveled 180°. By this way, the handle bar 10 is prevented from laying down onto the front wheel side.

Figure 8:
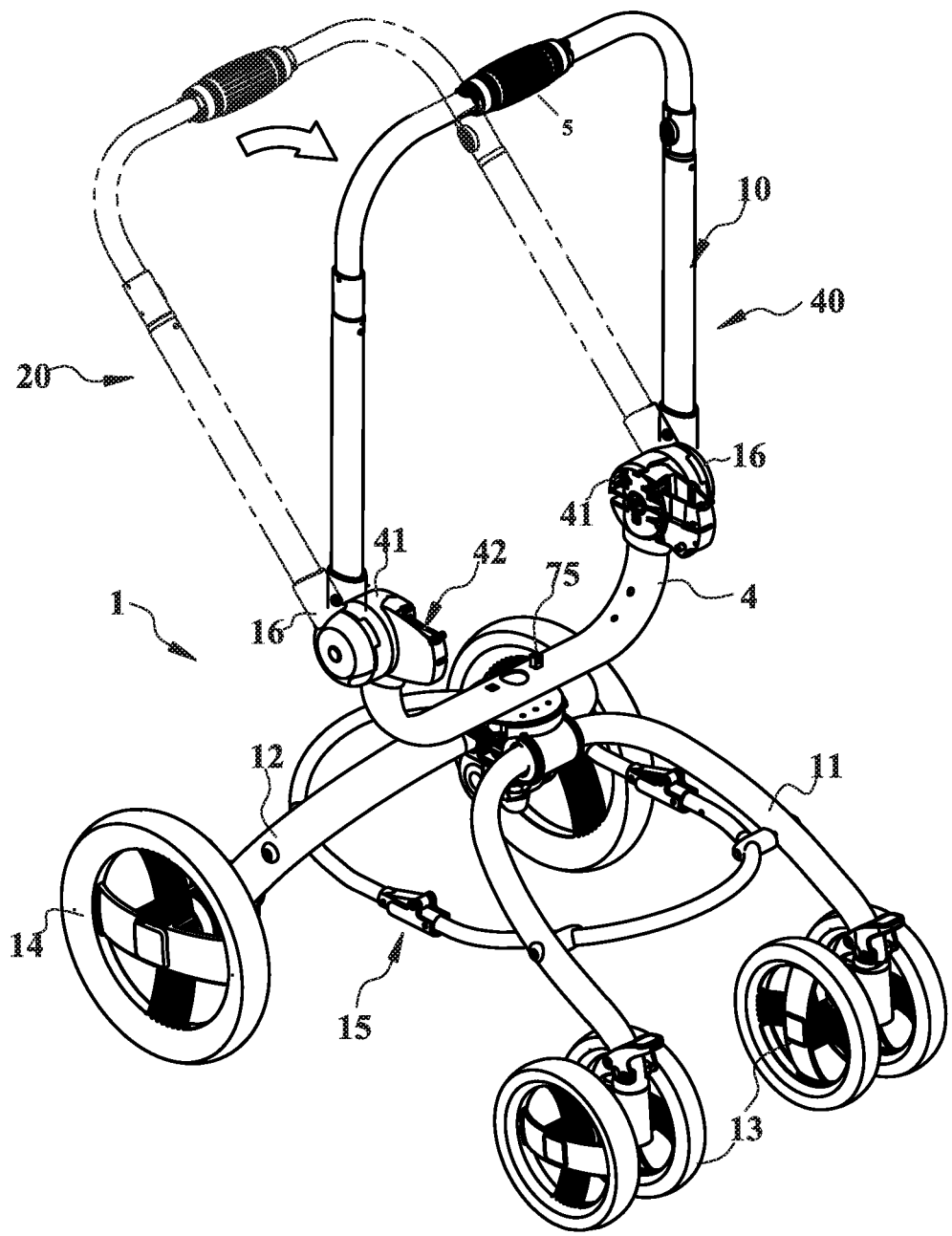
FIG. 8 is a perspective view schematically showing the handle bar has a rearward pushing position for pushing the stroller and an upright position for changing the facing direction of the swivel seat.
Figure 9:
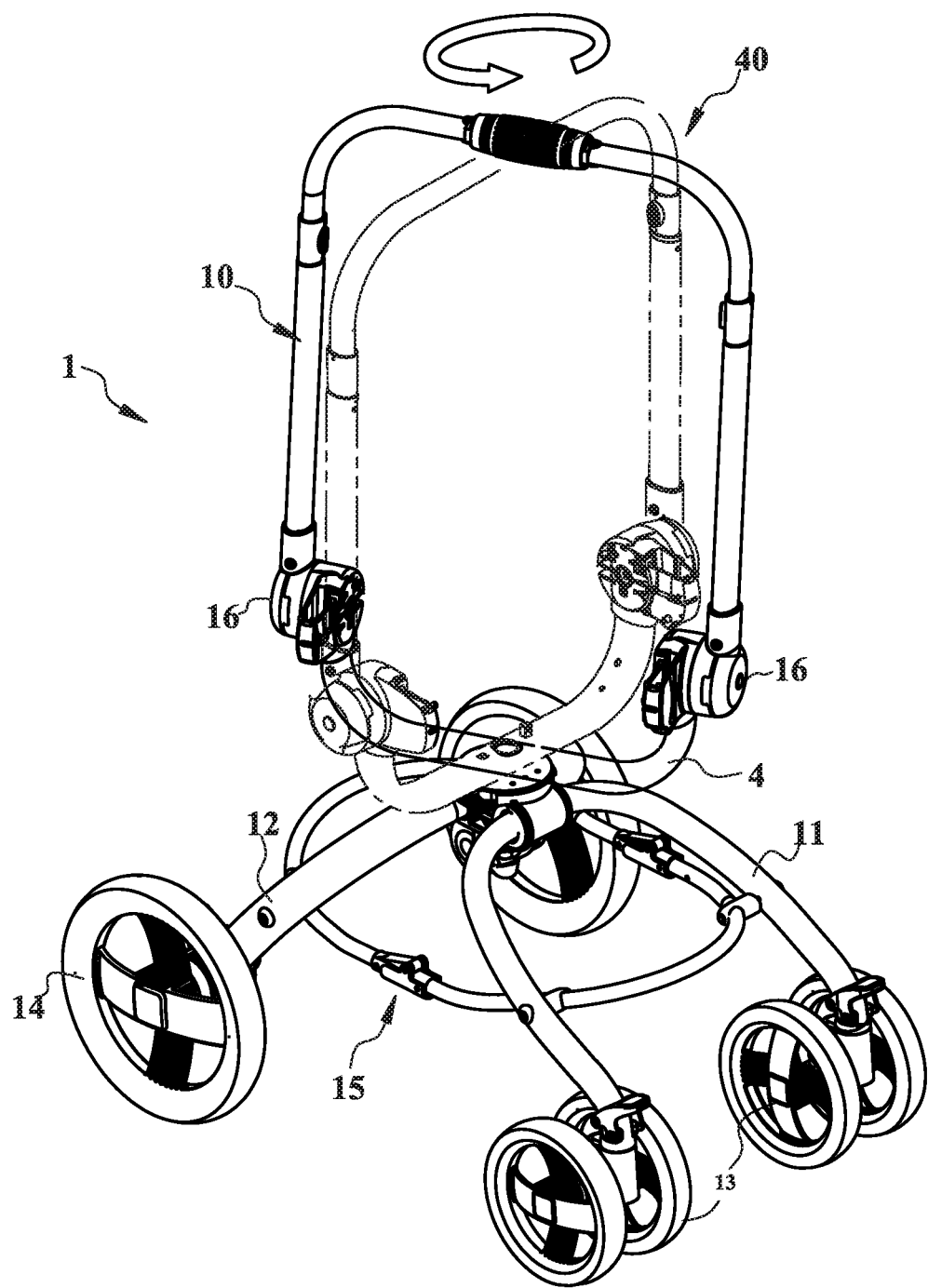
FIG. 9 is a perspective view schematically showing the handle bar which is used to swivel the seat support (and the swivel seat) in an upright position thereby to change the facing direction of the swivel seat.

As schematically shown in FIG. 8, the handle bar 10 can be locked in a rearward pushing position 20 for pushing the stroller from the rear side of the stroller. Further, the handle bar 10 can be released from the rearward pushing position 20 to an upright position 40 by manipulating a release mechanism 5 installed on the handle bar 10. When the handle bar 10 is released from the rearward pushing position 20 and rotated to the upright position 40, drives the locking member 51 to unlock and rotate the seat support 4 as schematically exampled in FIG. 9 for interchanging the facing directions of the seat 2 and seat support 4.

Referring 3, 5 to 7, the limiting mechanism 7 is associated between the wheeled frame 1, the seat support 4 and the handle bar 10, for preventing the handle bar 10 from rotating toward the front wheel side while tilting up the handle bar 10 and rotating the seat support 4 for interchanging the facing directions.

When one of the stoppers 71 or 72 is protruded and met with the extending portion 17 of the rotate joint 16, the stopper 71 or 72 stops the handle bar 10 at the upright position 40; when the swivel seat 2 has rotated 180°, said protruded stopper 71 or 72 will retract, and another stopper 72 or 71 is protruded and met with the extending portion 17 to prevent the handle bar 10 from laying down onto the front wheel side.

By this way, the limiting mechanism 7 can then function to avoid the users or care-givers from unintentionally laying down the handle bar onto the front wheel side while changing the facing direction of the swivel seat 2.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A stroller frame comprising:
   a wheeled frame, having a front wheel side and rear wheel side;
   a seat support, pivotally mounted atop the wheeled frame about a seat support axis, and detachably connected to a seat, said seat support releasably locked in a forward facing direction and a rearward facing direction by a locking member; and
   a handle bar, pivotally and lockably connected to the seat support about a handle bar axis and associated with the locking member;
   wherein when the handle bar is positioned in an upright position, a limiting mechanism associated between the wheeled frame, the seat support and the handle bar, prevents the handle bar from rotating about the handle bar axis from the upright position to a position extending toward the front wheel side.

2. The stroller frame according to claim 1, wherein the handle bar has a rearward pushing position for pushing from a rear side of the stroller and said upright position for unlocking the seat support from the facing directions by driving the locking member.

3. The stroller frame according to claim 1, wherein the locking member is retractably mounted on an underside of the seat support.

4. The stroller frame according to claim 1, wherein the wheeled frame is formed with a pair of locking positions for engaging with the locking member.

5. The stroller frame according to claim 4, wherein the locking positions are two indents.

6. The stroller frame according to claim 5, wherein the two indents are spaced 180° apart from each other.

7. The stroller frame according to claim 5, wherein the locking positions are formed on a pivotal support base.

8. The stroller frame according to claim 1, wherein the wheeled frame comprises:
   a pivotal support base, having an axle hole for pivotally connecting the seat support and a pair of locking position for engaging with the locking member;
   a front leg having an upper end pivoted to the pivotal support base, and a lower end connected to a front wheel set on the front wheel side; the front wheel set having an unfixed-direction mode and functioning as a castor;

a rear leg having an upper end pivoted to the pivotal support base, and a lower end connected to a rear wheel set on the rear wheel side; the rear wheel set having a fixed-direction mode.

9. The stroller frame according to claim 8 wherein the seat support has a downward extending shaft swivelably retained in the axle hole.

10. The stroller frame according to claim 9 wherein the seat support has a connecting base, and the handle bar has a rotate joint pivoted to the connecting base; the rotate joint has an extending portion protruded into the connecting base; and the limiting mechanism includes a pair of stoppers which can retract and protrude in turn within the connecting base for stopping the handle bar at the upright position until the swivel seat is rotated 180° thereby to prevent the handle bar from laying down onto the front wheel side.

11. The stroller frame according to claim 10 wherein the limiting mechanism further comprising:
a swing arm pivoted within the connecting base, having two ends for pivoting with the pair of stoppers;
a movement-transfer slider movably installed in the connecting base for driving the swing arm;
a support mount having a driving slant formed on an upper side thereof; and
a pair of driving elements associated with the movement-transfer slider through an associating element, movably installed between the seat support and the support mount, each driving element has one end slidably abutting against the driving slant for driving the movement-transfer slider thereby to make the pair of stoppers to protrude and retract in turn.

12. The stroller frame according to claim 11 wherein one of the pair of stoppers is protruded to stop the handle bar at the upright position; when the swivel seat has rotated 180°, said protruded stopper will retract, and the other one of the pair of stoppers is protruded to prevent the handle bar from laying down onto the front wheel side.

* * * * *